United States Patent [19]

El-Wailly

[11] Patent Number: 5,734,707
[45] Date of Patent: Mar. 31, 1998

[54] TELEPHONE SYSTEM

[76] Inventor: Penelope L. El-Wailly, 6841 W. Emile Zole, Peoria, Ariz. 85381

[21] Appl. No.: 614,883

[22] Filed: Mar. 13, 1996

[51] Int. Cl.$^6$ .............................. H04M 1/60; H04M 9/00
[52] U.S. Cl. ...................... 379/167; 379/170; 379/171; 379/185; 379/58
[58] Field of Search ..................... 379/167, 170–171, 379/185, 58

[56] References Cited

U.S. PATENT DOCUMENTS 4,554,411  11/1985  Armstrong ............................. 379/167

FOREIGN PATENT DOCUMENTS 0052961  3/1984  Japan ..................... 379/167
0107041  4/1990  Japan ..................... 379/167

*Primary Examiner*—Curtis Kuntz
*Assistant Examiner*—Duc Nguyen
*Attorney, Agent, or Firm*—Tod R. Nissle, P.C.

[57] ABSTRACT

A telephone system includes a plurality of telephones which do not require the use of a telephone company central switching station and which do not require the use of any other central control station which receives and routes calls made between telephones in the system.

8 Claims, 4 Drawing Sheets

1
TELEPHONE SYSTEM

This invention relates to a telecommunications system.

In particular, the invention relates to a telephone system which does not require the use of a telephone company central switching station or the use of any other central control station which receives and routes calls made between telephones in the system.

In a further respect, the invention relates to a telephone system which does not require the user of a telephone to pay call processing service fees to a telephone company.

Existing telecommunication systems require a base or central switching system to route and control calls between telephones in the system. The cost and complexity of such central switching equipment requires that users of the telecommunication system pay call processing service fees to pay the cost and maintenance of the equipment and the salaries of the various personnel required to operate the system.

Accordingly, it would be highly desirable to provide an improved telecommunications system which enabled users to communicate without having to utilize a central switching station and having to pay call processing service fees.

Therefore, it is a principal object of the invention to provide an improved telecommunication system.

Another object of the invention is to provide an improved telecommunication system which does not require that telephone calls be routed through a central call processing station.

A further object of the invention is to provide an improved telecommunication system in which coded telephone communications are transmitted without requiring the user of a telephone to pay a service charge.

These and other, further and more specific objects and advantages of the invention will be apparent to those skilled in the art from the following detailed description thereof, taken in conjunction with the drawings, in which.

Briefly, in accordance with the invention, I provide a telephone system comprising a plurality of telephones. Each telephone includes a speaker; a microphone for sensing sounds traveling into the microphone and generating a voice signal representing the sounds; a ringer; memory means for storing an access code corresponding to the telephone number assigned to the telephone and for storing access codes each corresponding to one of the telephone numbers assigned to the other telephones in the telephone system; dialing means for dialing telephone numbers in the telephone, determine the access code corresponding to the dialed telephone number, and producing a dialing signal including the access code of the dialed telephone number; a transmitter for receiving and broadcasting the dialing signal and the voice signal in a selected frequency band; and, a receiver for receiving signals in the selected frequency band from one of the other telephones and analyzing the signals received in the selected frequency band to determine if the signals include the access code of the telephone, and activate the ringer to notify the user of the telephone of the presence of an incoming call. The receiver also, when the signals received in the selected frequency band include voice signals transmits the voice signals to the speaker.

Figure 1:
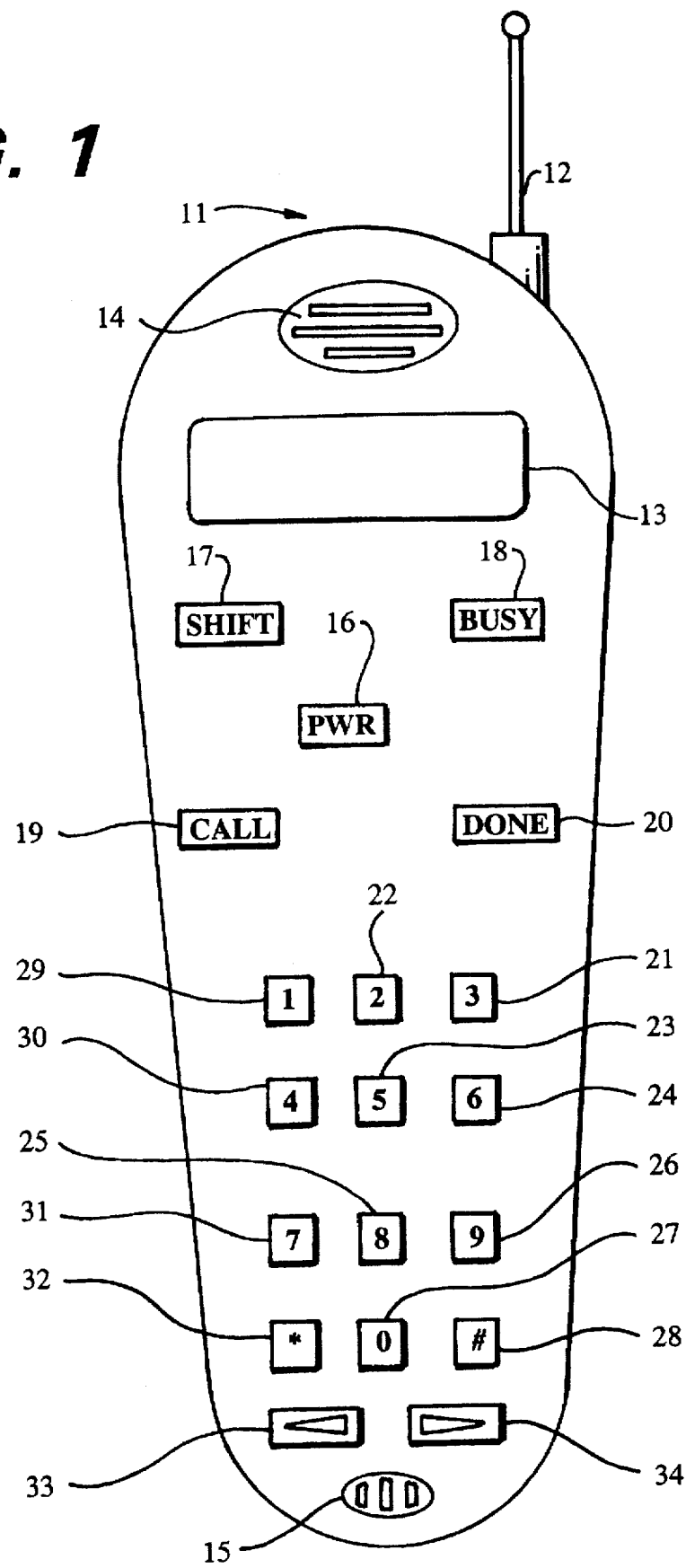
FIG. 1 is a perspective view of a telephone unit constructed in accordance with the principles of the invention.

Turning now to the drawings, which depict the presently preferred embodiments of the invention for the purpose of illustrating the practice thereof and not by way of limitation of the scope of the invention, and in which identical reference characters represent corresponding elements throughout the several views, FIG. 1 illustrates a telephone unit 11 constructed in accordance with the invention and including push buttons 21 to 32, a speaker 14 mounted in one end, and a microphone 15 mounted in the other end. A user holds unit 11 adjacent to his head so he can speak into microphone 15 and listen via speaker 14 to the voice of a caller with whom the user is conversing.

Each telephone unit 11 in a telecommunications system constructed in accordance with the invention would generally be equivalent to the unit of FIG. 1 and would have its own assigned local telephone number and associated access code and would have at least one destination telephone number and associated access code in memory. For sake of explaining the operation of the telephone system of the invention, a telephone unit 11 which functions as a local unit will be designated herein by reference character 11A, and a telephone unit 11 which functions as a destination telephone unit will be designated herein by reference character 11B (FIG. 1A). Local unit 11A has its own assigned local telephone number and associated access code and has in its memory the telephone number and access code of destination unit 11B. Destination unit 11B has its owned assigned local telephone number and access code (which are, as noted, also stored in the memory of unit 11A) and has in its memory the telephone number and access code of unit 11A. The structure of units 11A and 11B is identical to that of unit 11.

In operation of the telephone system of FIG. 1A, a local user powers local unit 11A by depressing button 16. Depressing button 16 a second time turns the power off. The user uses keys 21 to 32 to dial the destination number of destination telephone unit 11B remote from the local telephone unit 11A. The local user then depresses the call button 19. After the destination number is dialed and the call button 19 is depressed, the microcontroller 51 (FIG. 3) uses the destination number to generate a "seed" or marker which identified the point along a long pseudo random pattern of carrier frequencies at which the telephone unit 11A begins to track the frequencies. The pseudo random pattern of carrier frequencies comprises a fixed sequence of differing carrier frequencies. When the telephone unit 11A begins to track the carrier frequencies in the pseudo random pattern, it transmits airborne signals through antenna 12 on a series of frequencies which correspond to and track the fixed sequence of frequencies in the pseudo random pattern. Typically, the transmitter will, as it changes frequencies in accordance with the pseudo random pattern, change frequencies over 250 times a second. The output power of the signals transmitted through antenna 12 is presently preferably one watt or less. These signals include the access code of the remote destination telephone unit 11B. The carrier frequencies which are used by the local and destination telephone units and which define the pseudo random pattern of carrier frequencies lie in a predefined range. This range or band presently, by way of example and not limitation, comprises 902 MHz to 928 MHz, and is called the ISM band. Other frequency bands can, if desired, be selected. The bandwidth of each carrier frequency is presently about 250 KHz.

The destination unit 11B continuously scans or monitors the carrier frequencies or frequency bands in the 902 MHz to 928 MHz range. When the destination telephone unit 11b detects its access code in a signal received from carrier frequencies in the frequency range of 902 MHz to 928 MHz, the destination telephone unit 11B determines the location of the local telephone unit 11A in the pseudo random frequency hopping pattern, and synchronizes the frequency hopping of the destination telephone unit 11B with that of the local telephone unit 11A. The destination telephone unit 11B also activates its ringer to notify the owner of the destination unit 11B of the incoming call from the local telephone unit 11A. The user of destination unit 11B depresses any one of buttons 21 to 32, 16 to 19, 34, 35 on his unit 11B to enable the user of destination unit 11B to begin conversing with the use of the remote local unit 11A.

The destination and local telephone units 11B and 11A converse in a half duplex format, i.e., a transmission from the local unit 11A to the destination unit 11B must cease before a transmission from the destination unit 11B to the local unit 11A can begin. Units 11A and 11B each utilize time division multiplexing and share time while using each of the carrier frequency bands in the selected frequency range of 902 MHz to 928 MHz or while using frequency bands in any other available frequency range.

Each time the local telephone unit 11A or the destination telephone unit 11B receives a transmission from the other, the transmission comprises a quantity of bits in a packet format. This information packet includes error evaluation information. The receiving telephone unit 11, i.e. the local 11A or destination unit 11B as the case may be, uses this information packet to determine how many bits in the transmission are in error (BER). The receiving telephone unit 11 then reduces (or increases) the power of the transmission unit until the error rate exceeds a predetermined level. Such a reduction of power to minimum levels conserves power, minimizes interference with other telephone units 11, and maximizes the number of users within a given defined geographical area.

The greatest length of a reliable communication link between a local telephone unit 11A and a destination telephone unit 11B presently is in the range of five to fifty miles, preferably five to twenty miles.

Figure 2A:
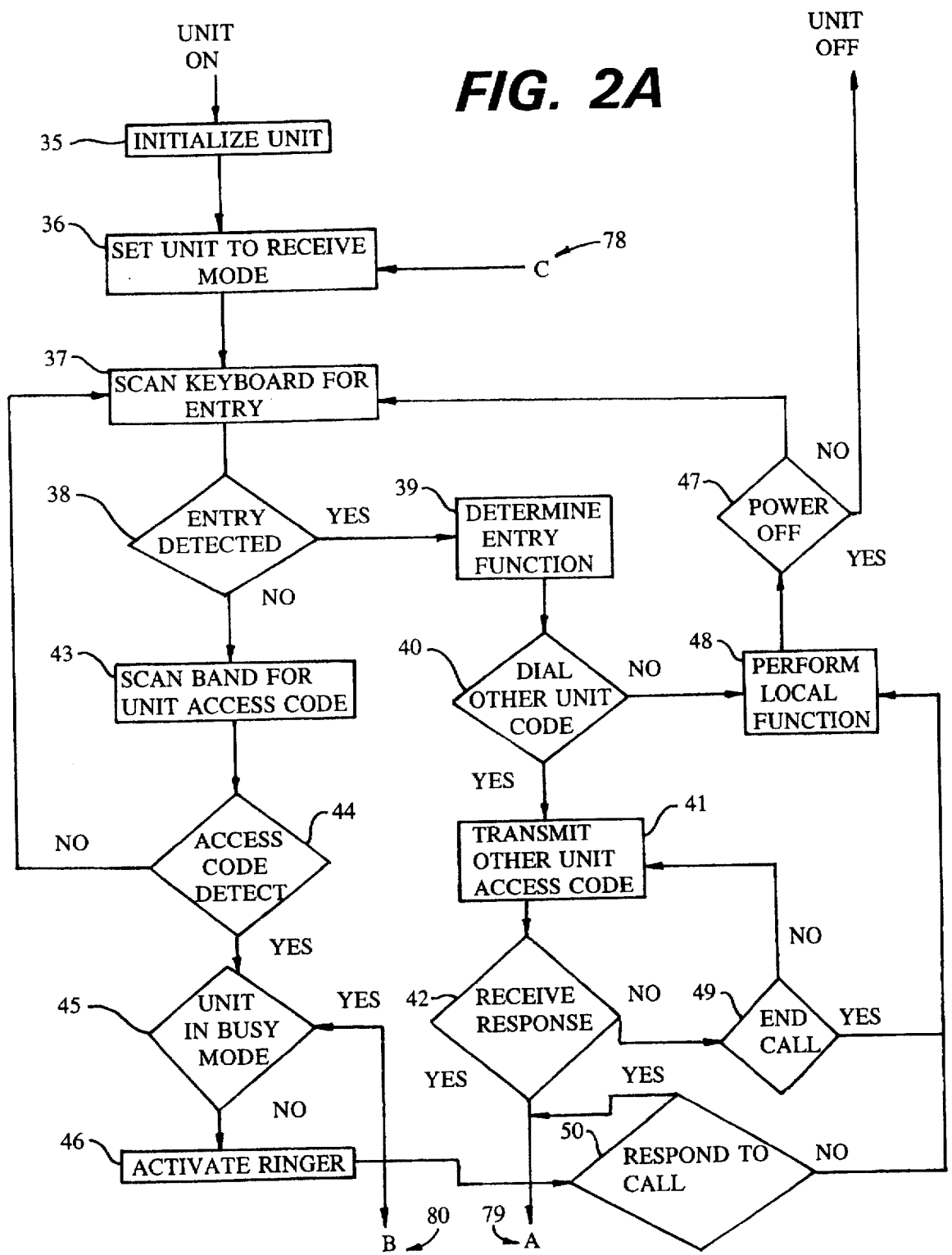
FIGS. 2A and 2B are a block diagram illustrating a typical program or logic function utilized in accordance with the presently preferred embodiment of the invention; and, FIG. 3 is a block diagram illustrating hardware components incorporated in the telephone unit of FIG. 1.
Figure 2B:
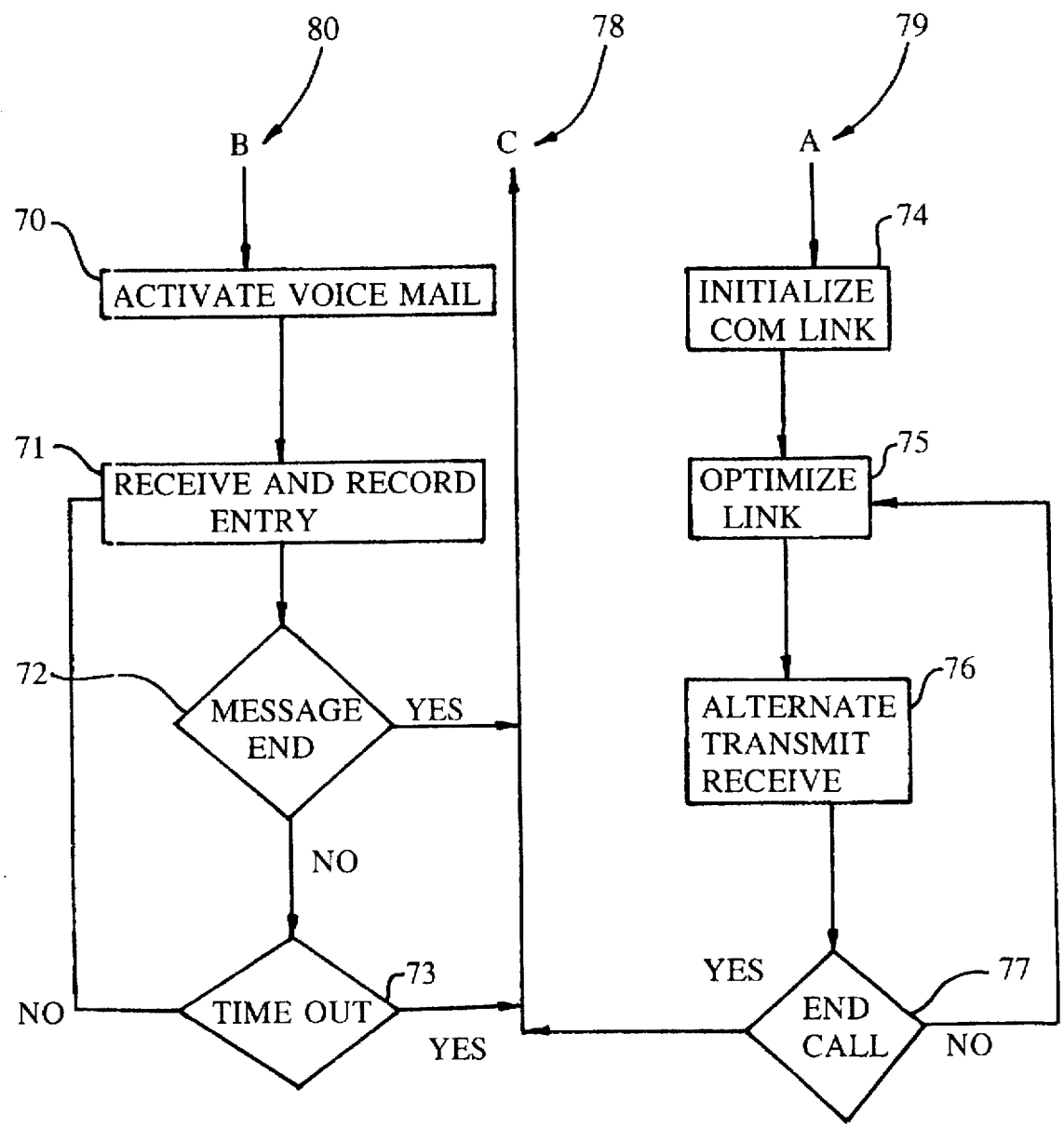
Figure 3:
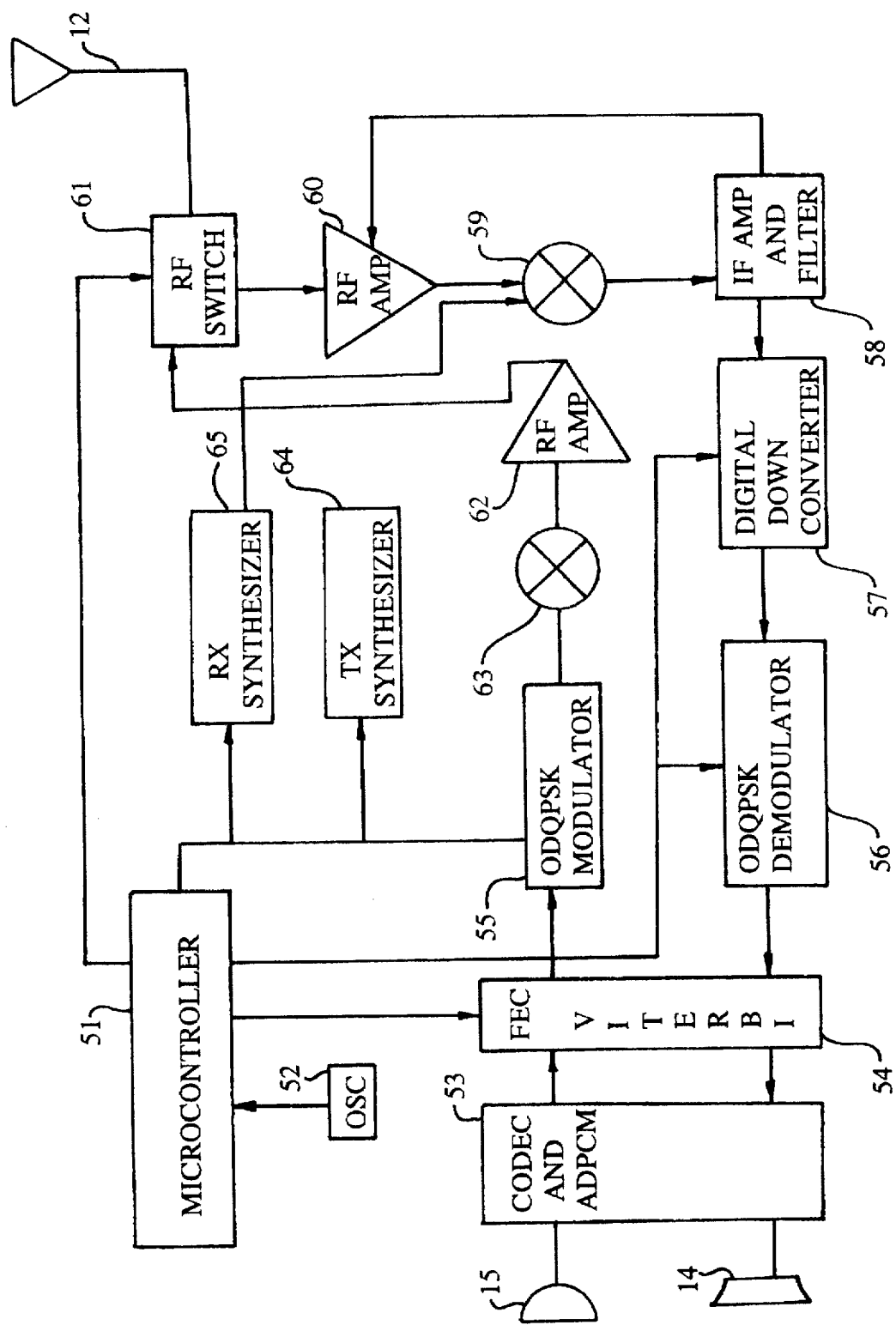

FIGS. 2A and 2B comprise a logic flow chart of the basic operation of a telephone unit 11, such as unit 11A or unit 11B. When unit 11 is turned on by depressing the power key 16, all of the components shown in FIG. 3 are initialized 35. Microcontroller 51 controls all operations of unit 11, including the initializing of the components in FIG. 3. After the components in FIG. 3 are initialized, microprocessor 51 sets 36 unit 11 in the receive mode to prepare for any incoming calls. Keypad 81 (FIG. 3) is continuously scanned 37 by controller 51 to monitor any entries by the user of unit 11. If entries on keys on the keypad 17 to 34 are not detected 38, the microprocessor monitors 43 the receiver in accordance with protocol stored in the microcontroller 51 memory. Monitoring of the receiver is carried out by scanning the available band of frequencies in a sequence determined by the identification (ID) number, or phone number, of the unit 11. If the microprocessor does not detect 44 the correct access code being received by the receiver via antenna 12, controller 51 directs the scanning 37 of the keypad 17 to 34 for any entries. Consequently, the receiver and keypad are continuously repeatedly scanned by microprocessor 51.

If the correct access code is detected 44 by microprocessor 51, and the unit 11 is not in the busy mode 45, the ringer is activated 46 and the ringing tone is heard from speaker 14. The ringer sounds emanate from speaker 14. The ringer is built into CODEC 53. When the busy mode is set by the user, the microprocessor 51 will accept an incoming call to record a message only.

If the user of unit 11 elects to ignore an incoming call by not responding 50 to the ringing, and there is no local function to perform 48 and the power for unit is not turned off 47, then unit 11 returns to scan the keypad for entry 37 command. If the user elects to respond 50 to the incoming call, the user depresses any one of the keys 17 to 34. The power key 16 cannot be used to respond to an incoming call because depressing key 16 will turn unit 11 off. When unit 11 is receiving a call it is termed the destination unit 11B. When unit 11 is initiating a call, then unit 11 is termed to local unit 11A.

When the user depresses a key 17 to 34 in response to a ringing tone in the speaker 14, microprocessor 15 initializes 74 (FIG. 2B) the communication link and optimizes 75 the transmission power of the destination unit 11B and the remote local unit 11A which is placing the call to the destination unit 11B. This step is essential because it reduces the size of the area covered by the transmission of signals between the destination unit 11B and local unit 11A. Reducing the size of area covered by the transmission of signals minimizes interference with other units 11. The transmission power is adjusted by microprocessor 15 as needed while the communication link between a local unit 11A and destination unit 11B is in use.

Unit 11 alternates between transmission and reception 76 using a frequency hop system define by the protocol of the telephone system. The link between the destination unit 11 and local unit 11 ends 77 if a signal is not received by one of the units or if the done key 20 is depressed. After the call ends, the controller sets the unit 11 to the receive mode 36.

When an access code is detected by controller 51 and unit 11 is in the busy mode 45, the voice mail feature of the unit 11 is activated 70 (FIG. 2B). The busy mode is activated by pressing key 18. When the voice mail feature is activated, a prerecorded message stored in the memory of unit 11 is transmitted to the local unit 11 which is initiating the call. The prerecorded message is stored 71 in the memory of unit 11 by the user. The prerecorded message gives the incoming caller a selected period of time in which to leave a recorded message 71 on the unit 11. After the incoming caller completes the message 72, or after the selected period of time has lapsed 73, controller 51 again sets the unit to the receive mode 36. The user stores 71 the prerecorded message in the memory of unit 11 in the same manner that a prerecorded message is entered in a telephone answering machine, i.e., this is one of the functions available in unit 11.

When the power for unit 11 is on and key 16 is depressed, microcontroller 51 turns unit 11 off and will not respond to any incoming calls from other units 11 and or to other entries on keypad 17 to 34.

When the power for unit 11 is on and controller 15 detects that one of keys 17 to 34 has been depressed, the function associated with the depressed key(s) is identified 39. If the function associated with the depressed key(s) is not dialing another remote destination unit 11B, the function is a local function which is performed 48, after which the controller 51 scans the keypad for entry 37 (assuming the power is not turned off 47). If the function associated with the depressed keys is calling another remote unit (a "destination unit"), then unit 11 is used as a local unit 11A to call a destination unit 11B by entering the ID number or code (phone number) 40 of the destination unit 11B in local unit 11A using keys 21 to 32. A shorthand designation of the ID number can be entered on keys 21 to 32 to recall the ID number from the memory in local unit 11A. After the ID number of the destination unit 11B is entered or recalled from memory, it is displayed on screen 13 of local unit 11A.

The call key 19 is then depressed. When key 19 is depressed, the process of transmitting 41 the access code of the destination unit 11B is initiated by the local unit 11A. If the destination unit does not respond, the user of the local unit 11A depresses the done key 20 to end the call 49 and, if appropriate, to cause the local unit to perform some local functions 48, after which controller 51 scans the keypad for entries 37. The local functions include but are not limited to adjusting the volume of the ringer and voice, storing the ID number of another unit 11 in memory, storing the unit own ID number (i.e., the phone number that identifies the unit 11), prerecording an outgoing message which is transmitted when the unit 11 is in the busy mode, and, listening to messages left by callers when the unit 11 is in the busy mode.

If the destination unit 11B responds 42 to the call initiated by the local unit 11A, the communication link between the two units is initialized 74 and the transmission power between the two units is optimized 75 such that the transmission power is sufficient for communication between the local unit 11A and destination unit 11B but not for communication over any greater distances. The local unit and destination unit then alternate transmitting and receiving 76 in accordance with the protocol earlier discussed. After the call ends 77, the controller 51 sets the unit to the receive mode 36.

If, when the local unit 11A makes a call, the destination unit 11B is busy or in use, a recorded message transmitted from the destination unit is heard by the user of the local unit 11A. The recorded message gives the user of the local unit 11A the option of leaving a recorded message. The user of the local unit 11A terminates the call by pressing the done key 10. After the done key 10 is depressed, by the user of the local unit 11A or the destination unit 11B, the call is terminated and the controller 51 in each unit resumes its scanning of the keypad and the receiver. If the signal strength between the units becomes too weak and the communication link between the units is lost, the call is terminated and the controller 51 in each unit resumes its scanning of the keypad and receiver.

Components of the telephone apparatus of FIG. 1 are further illustrated in FIG. 4 and include a microphone 15 which converts an audio signal into an analog signal that is amplified, filtered and converted to a 64 Kb serial digital signal in the CODEC portion of unit 11. This digital signal is compressed to a 16 Kb (or less) signal in the ADPCM (Adaptive Digital Pulse Code Modulation). The compression of the signal to 16 Kb (or less) reduces the required frequency channel bandwidth for transmission of the signal. The CODEC and ADPCM are integrated in circuit 53.

The FEC (forward error correction) 54 of unit 11 functions to enhance transmission reliability by encoding the digital bit stream to make is less susceptible to noise during transmission. The FEC includes the VITERBI. The encoded digital signal produced by the FEC 54 is modulated by the ODQPSK modulator 55. If desired, BPSK, QPSK or other modulation methods can be utilized. In FIG. 4, the ODQPSK (Offset Differential Quadrature Phase Shift Keying) modulation method was selected due to the availability of the demodulator in a single integrated circuit and due to its popularity in new digital communication systems. The modulated signal from the ODQPSK modulator 55 is upconverted by combining it in mixer 63 with the output from the Tx synthesizer 64. The combined signal output by mixer 63 presently has a carrier frequency in the range of 902 MHz and 928 MHz. At each frequency hop, one of several carrier frequencies having a 250 KHz bandwidth is selected for transmission of the modulated signals. The selected carrier frequency comprises the communication channel between any pair of units 11.

The radio frequency amplifier 87 amplifies and filters the signals from mixer 63. RF switch 61 diverts the signal into the telephone antenna 12 for transmission. The output power of the transmitter is presently preferably equal to or less than one watt to satisfy Part 15 of the Federal Communication Commission rule on the available ISM bands. This output power can be varied as desired.

When antenna 12 receives a signal from another unit 11, the signal is directed by RF switch 61 to the RF amplifier 60. The amplified signal from amplifier 60 is down-converted to an intermediate frequency (IF) by mixing 59 it with the output of the receiver synthesizer 65. As was the case with the transmitter synthesizer 64, the output signal from mixer 59 has a carrier frequency tuned to the particular communication channel(s) being utilized by two units 11 transmitting a conversation between the users of the units 11.

The intermediate frequency signal from mixer 59 is filtered and amplified by IF amp & filter 58 and an AGC (automatic gain control) signal is generated and fed back to the RF amplifier 60 to maintain the strength of the signal received by antenna 12 at a proper constant level. The digital downconverter 57 converts the IF signal from filter 58 to a baseband signal. The single integrated circuit ODQPSK demodulator 56 generates a digital soft data code which can be processed by the VITERBI error correction circuit in the FEC 54. The output of the FEC 54 comprises a 16 Kb (or less) serial data stream. This data stream is corrected for errors occurring during transmission and is decompressed by the ADPCM 94 to produce a 64 Kb data stream output which is converted by the CODEC 94 from a digital signal to an analog signal. The analog signal is filtered and transmitted to speaker 12 which converts the analog signal to an audio signal.

In both the transmitter and receiver of unit 11, appropriate filtering of the signals is done. A diversity antenna 82 can be used to improve reception, if necessary.

The oscillator 52 provides the frequencies necessary for operation of all of the individual circuits i the transmitter and receiver section of the components of FIG. 4.

Having described my invention in such terms as to enable those of skill in the art to understand and practice it, and having identified the presently preferred embodiments thereof, I claim:

1. A telephone system comprising at least three telephones each including
   (a) a speaker;
   (b) a microphone for sensing sounds traveling into said microphone and generating a voice signal representing said sounds;
   (c) a ringer;
   (d) memory means for storing an access code corresponding to the telephone number assigned to the telephone and for storing access codes each corresponding to a different one of two other telephone numbers, each of said two other telephone numbers being assigned to a different one of the other two telephones in the telephone system;
   (e) dialing means for dialing telephone numbers in the telephone, determining the one of said access codes corresponding to a dialed telephone number, and producing a dialing signal including said one of said access codes;
   (f) a transmitter for receiving said dialing signal and said voice signal, and for broadcasting as transmission signals said dialing signal and said voice signal through the air in a selected frequency band;

(g) a receiver for receiving said airborne transmission signals in said selected frequency band from one of the other telephones and (i) analyzing said transmission signals received in said selected frequency band to determine if said transmission signals include said access code of the telephone, and, when said transmission signals include said access code of the telephone and the telephone is on hook, activating said ringer to notify the user of the telephone of the presence of an incoming call, and (ii) when said signals received in said selected frequency band include voice signals, transmitting said voice signals to said speaker;

each of the three telephones being able to (i) receive said airborne transmission signals directly from either of the other two telephones, (ii) transmit said transmission signals through the air directly to either of the other two telephones, and (iii) carry on a telephone conversation with either of the other two telephones by receiving and transmitting said airborne transmission signals, and without routing said transmission signals through auxiliary switching equipment separate and spaced apart from the three telephones.

2. The telephone system of claim 1 wherein said transmitter includes means for determining the strength of signals between the telephone and one of the other telephones being called by the telephone and for altering the strength of signals broadcast by said transmitter to the one of the other telephones to a minimum acceptable level to conserve power and minimize interference with other transmitted signals.

3. The telephone system of claim 1 wherein said transmitter and said receiver operate at different times.

4. The telephone system of claim 1 wherein said transmitter scans said selected frequency band to identify available frequencies and then broadcasts said transmission signals over at least a selected one of said available frequencies.

5. The telephone system of claim 1 wherein said receiver continuously scans said selected frequency band to receive and analyze said transmission signals broadcast over frequencies in said selected frequency band.

6. The telephone system of claim 4 wherein said receiver continuously scans said selected frequency band to receive and analyze said transmission signals broadcast over frequencies in said selected frequency band.

7. The telephone system of claim 6 wherein said transmitter changes broadcast frequencies in a pseudo random pattern.

8. The telephone system of claim 7 wherein said receiver synchronizes frequency hopping with the pseudo random pattern of said transmitter in said one of the other telephones when said transmitter in said one of the other telephones is broadcasting said transmission signals for receipt by said receiver.

* * * * *